United States Patent [19]

Shockling

[11] Patent Number: 5,047,299

[45] Date of Patent: Sep. 10, 1991

[54] ELECTROCHEMICAL CELL APPARATUS HAVING AN INTEGRATED REFORMER-MIXER NOZZLE-MIXER DIFFUSER

[75] Inventor: Larry A. Shockling, Plum Borough, Pa.

[73] Assignee: Westinghouse Electric Corp., Pittsburgh, Pa.

[21] Appl. No.: 559,111

[22] Filed: Jul. 25, 1990

[51] Int. Cl.$^5$ ............................................. H01M 8/12
[52] U.S. Cl. ...................................... 429/20; 429/30; 429/34; 429/39
[58] Field of Search ....................... 429/12, 17, 20, 19, 429/26, 31, 34, 38, 39

[56] References Cited

U.S. PATENT DOCUMENTS

| | | | |
|---|---|---|---|
| 3,718,506 | 2/1973 | Fisher et al. | 136/86 C |
| 4,395,468 | 7/1983 | Isenberg | 429/31 |
| 4,490,444 | 12/1984 | Isenberg | 429/31 |
| 4,729,931 | 3/1988 | Grumble | 429/17 |
| 4,808,491 | 2/1989 | Reichner | 429/13 |

*Primary Examiner*—Anthony Skapars
*Attorney, Agent, or Firm*—Daniel P. Cillo

[57] ABSTRACT

An electrochemical apparatus (10) is made having a generator section (22) containing electrochemical cells (16), a fresh gaseous feed fuel inlet (28), a gaseous feed oxidant inlet (30), and at least one hot gaseous spent fuel recirculation channel (46), where the spent fuel recirculation channel (46), passes from the generator chamber (22) to combine with the fresh feed fuel inlet (28) to form a reformable mixture, where a reforming chamber (54) contains an outer portion containing reforming material (56), an inner portion preferably containing a mixer nozzle (50) and a mixer-diffuser (52), and a middle portion (64) for receiving spent fuel, where the mixer nozzle (50) and mixer-diffuser (52) are preferably both within the reforming chamber (54) and substantially exterior to the main portion of the apparatus, where the reformable mixture flows up and then backward before contacting the reforming material (56), and the mixer nozzle (50) can operate below 400° C.

12 Claims, 1 Drawing Sheet

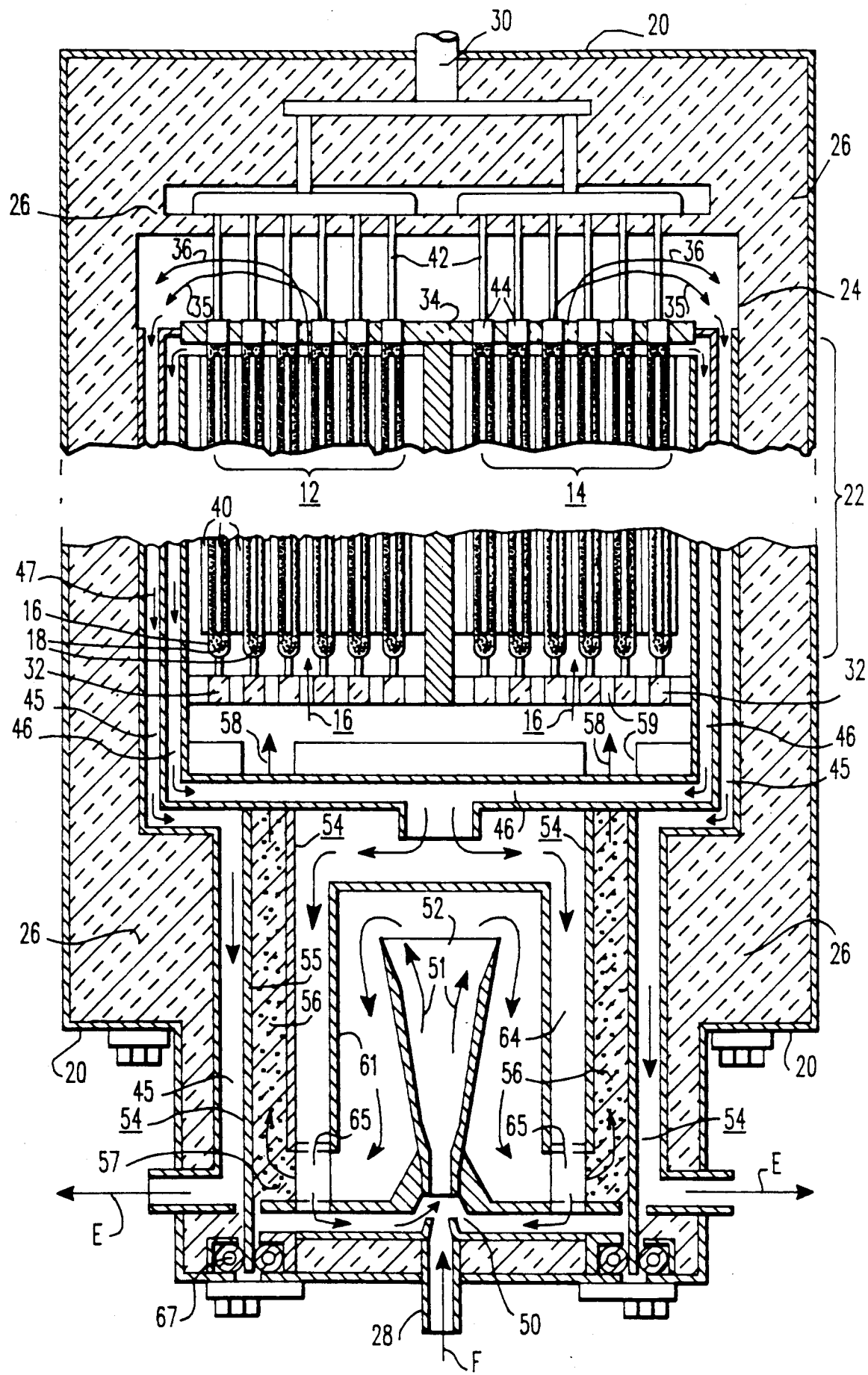

ELECTROCHEMICAL CELL APPARATUS HAVING AN INTEGRATED REFORMER-MIXER NOZZLE-MIXER DIFFUSER

The Government of the United States of America has rights in the invention pursuant to Contract No. DE-AC21-80ET-17089, awarded by the United States Department of Energy.

BACKGROUND OF THE INVENTION

This invention relates to a compact, integrated, combination reformer-ejector for an electrochemical apparatus, such as a fuel cell generator, utilizing fresh, gaseous feed fuel which must be reformed.

High temperature, solid oxide electrolyte fuel cell generator apparatus and fuel cell configurations are well known, and taught, for example, in U.S. Pat. Nos. 4,395,468 and 4,490,444, respectively, (Isenberg). There, feed fuel, either $H_2+CO$, or previously reformed natural gas, is fed into the apparatus at one end and flows parallel to exterior fuel electrode surfaces of the elongated fuel cells. Spent fuel is combusted with spent oxidant in a separate chamber and then exits the apparatus.

Other high temperature fuel cell generator apparatus designs are known, where spent fuel is recirculated and aspirated into fresh, preheated feed fuel, in the center of the apparatus, at apparent temperatures of approximately 600° C. to 800° C., which mixture is fed through the fuel cells, as taught in U.S. Pat. No. 3,718,506 (Fischer et al.). There, spent fuel exiting from the fuel cells, is mixed with fresh feed fuel, such as propane, at a jet-pump nozzle, for flow from one end to the other of the series-connected fuel cells. This combination of spent fuel with fresh fuel prevents soot formation within the cells. Additional spent fuel mixes with spent air and flows around and through a catalytic afterburner structure surrounding the fuel cells for complete combustion, which heats the fuel cells, allowing efficient operation at approximately 800° C. In U.S. Pat. No, 4,729,931 (Grimble), spent fuel and combusted fuel are mixed, and then drawn into fresh feed fuel at an ejector nozzle, in an interior chamber of the generator apparatus. The entire mixture then passes through a reforming material, located in the same chamber as the ejector, to form a reformed gas which is fed to contact fuel cells within the apparatus.

Another generator design, to prevent chilling of the fuel cell, is taught in U.S. Pat. No. 4,808,491 (Reichner), where a combusted exhaust of spent fuel and spent oxidant provides corner heating in the generator apparatus. There, fresh feed fuel is fed into a manifold at the bottom of the apparatus, the bottom of which manifold may contain reforming catalyst and may be heated by the combusted exhaust. The feed fuel then flows parallel to the exterior fuel electrode surfaces of the elongated fuel cells. The fresh feed fuel is not mixed with any spent gases within the apparatus.

Natural gas (methane plus ethane, propane, butane and nitrogen) and other higher hydrocarbons are likely fuels for many of these fuel cell apparatus. This natural gas must be reformed, that is, converted to carbon monoxide and hydrogen, through the use of a catalyst and excess water vapor, prior to its utilization in the fuel cell. The reforming reaction is endothermic, requiring a supply of heat, and is best performed at temperatures close to 900° C. The heat required for reforming is a significant fraction of the excess heat that results from fuel cell operation.

The use of recirculated spent fuel to provide water vapor and $CO_2$ for fresh feed fuel, by means of an ejector powered by the inlet fresh fuel pressure, has the potential to result in several problems. The ejector in the typical fuel cell apparatus is located directly in the hot fuel cell environment and is bathed by the hot recirculation gas stream, and the nozzle must be insulated or cooled to prevent carbon deposition from natural gas feed fuel, due to "cracking" which occurs at temperatures above about 400° C.

Also, contaminants, such as silica from the nozzle's thermal insulation, or from other generator insulation, picked up and carried by the spent fuel stream, can cause deactivation of the reformer catalyst. The high temperature, due to ejector and reformer location in the hot recirculation gas stream, also requires a permanently-welded assembly of the ejector into the recirculation ducting, to provide adequate sealing, thus increasing fabrication difficulty and impeding access for maintenance. Thus, carbon deposition, silica transport and high temperature sealing are areas of concern for efficient reformation with recirculation.

What is needed is a compact apparatus which eliminates carbon deposition concerns at the fresh feed fuel-recirculation gas mixing point, eliminates the need for high temperature sealing, which also allows heat exchange to a reformer compartment or material, and which allows compact integration of removable fuel feeding and reforming sections. It is one of the main objects of this invention to provide such an apparatus.

SUMMARY OF THE INVENTION

Accordingly, the invention resides in an electrochemical apparatus having a fresh gaseous feed fuel inlet; gaseous feed oxidant inlet; gaseous spent fuel recirculation channel; separate hot combusted exhaust gas exit channel; a generator chamber containing a plurality of electrochemical cells; and a reforming chamber; characterized in that the reforming chamber has a top close to the generator chamber, and a bottom closest to the fresh gaseous feed fuel inlet, and contains: (a) an outer portion containing reforming material, which outer portion connects to the generator chamber, (b) an inner portion containing a mixer-diffuser within a shell barrier, which inner portion connects to the outer portion at the bottom of the reforming chamber, and (c) a middle portion between the inner and outer portions, connected to the gaseous spent fuel recirculation channel at the top of the reforming chamber and feeding into the mixer-diffuser at the bottom of the reforming chamber, where the mixer-diffuser is within the reforming chamber, a mixer nozzle is near the bottom of the reforming chamber, which mixer nozzle is connected to the fresh gaseous feed fuel inlet, and where the mixer nozzle also feeds into the mixer-diffuser at the bottom of the reforming chamber. The mixer-diffuser has a narrow mixer section which broadens out to a flared diffuser section, so that it has a narrow entrance and a broad exit. The mixer injector, which has a narrow opening feeding into the mixer-diffuser forces high pressure feed fuel at a high velocity into the mixer-diffuser, causing aspiration and entrainment of the recirculating spent fuel, the whole, causing an ejector effect.

Preferably, both the mixer nozzle and the mixer diffuser are within the inner portions of the reforming chamber, to provide a compact apparatus. The reforming chamber is readily accessible and removable from the apparatus. The invention also resides in that a portion of the hot combusted exhaust gas exit channel contacts the outside of the reforming chamber, allowing heat transfer between said channel and reforming chamber.

The invention further resides in a high temperature electrochemical apparatus, operating on a gaseous oxidant and a fresh gaseous feed fuel, having a fresh gaseous feed fuel inlet; gaseous feed oxidant inlet; gaseous spent fuel recirculation channel; separate hot combusted exhaust gas exit channel; a generator chamber containing a plurality of electrochemical cells; and a reforming chamber; characterized in that the reforming chamber has a top close to the generator chamber, and a cooler bottom close to the fresh gaseous feed fuel inlet, and contains: (a) an outer portion containing reforming material, (b) an inner portion containing a mixer-diffuser, and (c) a middle portion between the inner and outer portions, for receiving hot recirculation gas from the gaseous spent fuel recirculation channel; where the mixer-diffuser is within the reforming chamber, where hot recirculation gas fed into the middle portion of the reforming chamber mixes with fresh gaseous feed fuel at a mixer nozzle near the bottom of the reforming chamber, and the gaseous mixture expands in the mixer-diffuser as it passes to a top portion of the reforming chamber, and where the expanded gaseous mixture flows back toward the bottom of the reforming chamber around the mixer-diffuser, and then enters the outer portion of the reforming chamber near the bottom of the reforming chamber, and flows through the reforming material.

The use of an integrated mixer nozzle and a mixer-diffuser, such as an ejector, within the body of the reforming chamber eliminates complicated crossover gas streams, reduces overall length of the apparatus, makes more efficient use of the reforming material, increases recuperative heat transfer, and reduces the heat loss to the ambient.

The term "fuel electrode" as used herein means that electrode in contact with fuel, the term "air electrode" as used herein means that electrode in contact with air or oxygen, and the term "spent" fuel, oxidant, or air as used herein means partially reacted, low BTU fuel or partially reacted, depleted gaseous oxidant, or depleted air containing about 5% to 15% oxygen. The term "spent" fuel does not include the mixture of spent fuel combusted with spent oxidant or air, which mixture is herein defined as "combusted exhaust gas".

The location of the mixer-diffuser, and the mixer nozzle in a low-temperature position eliminates the need for forced cooling of the nozzle. The ducts which carry the recirculating spent fuel and which are in contact with the reforming chamber, and the ducts which carry the fuel mixture to and through the reforming material, may be concentric, with heat conduction fins providing optimum heat exchange between the two gas streams. This heat exchange minimizes energy loss from the heat capacity of the hot extracted spent fuel, while allowing the nozzle temperature of the ejector, and therefore of the fresh fuel to remain below the 400° C. limit above which carbon deposition has been observed.

BRIEF DESCRIPTION OF THE DRAWINGS

In order that the invention can be more clearly understood, conventional embodiments thereof will now be described, by way of example, with reference to the accompanying drawing, which is a side view in section of one embodiment of an electrochemical cell apparatus according to this invention, showing extraction of recirculated spent fuel, mixture of this spent fuel with incoming fresh feed fuel in a reforming chamber containing a mixer nozzle and a mixer-diffuser, and passage of this gaseous mixture into the apparatus.

DESCRIPTION OF THE PREFERRED EMBODIMENTS

Referring now to the FIGURE, an electrochemical cell apparatus or generator is shown containing two cell bundles 12 and 14, each bundle containing a plurality of parallel, axially elongated electrochemical cells 16, such as solid oxide fuel cells. The cells are located in generator compartment or section 22. Each cell has an exterior fuel electrode 18 covering its axially elongated surface, shown dotted for the sake of clarity, an interior air electrode, and a solid oxide electrolyte between the electrodes (air electrode and electrolyte not shown), as is well known in the art. The air electrode is generally a doped ceramic of the perovskite family, for example, doped $LaMnO_3$, the electrolyte is generally yttria stabilized zirconia, and the fuel electrode is generally a zirconia-nickel cermet material. A calcia stabilized zirconia support for the air electrode can also be used. For a detailed description of the materials and construction of an exemplary fuel cell, reference can be made to U.S. Pat. No. 4,490,444, herein incorporated by reference.

The electrochemical cell apparatus will operate with an interior temperature in the range of about 600° C. to about 1,200° C. An outer housing 20 surrounds the entire apparatus. The housing is preferably comprised of a high temperature resistant metal such as Inconel. Thermal insulation 26, such as low density alumina is contained within the outer housing as shown. Penetrating the housing 20 and insulation 26 is fresh gaseous feed fuel inlet 28, the fresh feed fuel shown as F, and gaseous oxidant, such as air or oxygen, feed 30, as well as ports for electrical leads and the like, not shown. The generator chamber 22 extends between wall 32 and a porous barrier 34. The porous barrier 34 need not be a sealed structure. The porous barrier 34, in particular, is designed to allow spent fuel gas flow, indicated by arrows 36, from the generator chamber 22, operating at a pressure slightly above atmospheric, to the combustion chamber 24, operating at a slightly lower pressure, where the spent gas combines with spent oxidant, forming exhaust gas which passes through channel 45.

High temperature, elongated, solid oxide electrolyte cells 16 extend between the combustion chamber 24 and the wall 32. The cells have open ends 44 in the combustion chamber 24, and closed ends in the generator chamber 22 near wall 32. Each individual cell generates approximately one volt on open circuit, and a plurality are electrically interconnected through conducting felts 40, usually nickel fiber metal, preferably in a series-parallel rectangular array, as described in U.S. Pat. No. 4,395,468, herein incorporated by reference.

By way of example, during operation, a gaseous oxidant, such as air, is fed through oxidant feed inlet 30, and enters the oxidant feed conduits 42 at a temperature of approximately 500° C. to 700° C., and a pressure above atmospheric, being optionally heated prior to entering the housing by conventional means, such as a heat exchanger coupled with a blower. The oxidant, within the conduits, is passed through the combustion chamber 24, where it is further heated to a temperature of approximately 800° C. to 900° C. by the combusted exhaust gas. The oxidant then flows through the length of the oxidant circuit, through the conduits 42 which extend down the inside length of the fuel cells, being further heated to approximately 1,000° C., by virtue of absorbing most of the heat generated during the electrochemical reaction. A smaller fraction of the heat is absorbed by the fuel.

The oxidant is discharged into the closed end bottom of the fuel cells 16. The oxidant within the fuel cells reverses direction, and electrochemically reacts at the inner air electrode along the inside active length of the cells, depleting somewhat in oxygen content as it approaches the open ends 44 of the cells. The depleted oxidant is then discharged into the combustion chamber 24 through the open cell ends 44, and is shown as spent oxidant streams 35. This spent oxidant combusts with depleted fuel, where part of the total depleted fuel passes through porous barrier 34 as shown by arrows 36, to form combusted exhaust gas 47, which exits the apparatus through combusted exhaust gas exit channels 45, which can be routed to contact the reforming chamber 54, as shown, finally exiting as exhaust gas E. The channels 45 can be made of a high temperature resistant metal, such as Inconel.

In the apparatus shown, a gaseous fuel that has not yet been reformed, such as a gaseous hydrocarbon, including hydrocarbons such as methane ($CH_4$), ethane ($C_2H_6$), propane ($C_3H_8$), and the like, vaporized petroleum fractions such as naphtha, and alcohols, such as ethyl alcohol ($C_2H_5OH$), and the like, and natural gas, typically a mixture of 85% methane and 10% ethane with a balance of propane, butane and nitrogen, can be used. These reformable fuel mediums F are fed into the generator through fresh feed fuel inlet 28.

In the apparatus shown, a major portion of the hot gaseous spent fuel formed along the axial length of the cells 16 passes to at least one hot spent fuel recirculation channel 46, which can be made of a high temperature resistant metal such as Inconel. Another portion of the hot spent fuel passes into combustion chamber 24, shown as arrows 36, as previously described, to combust with spent air, shown as arrow 35, and preheat the fresh oxidant feed.

The hot spent fuel recirculation channel 46 passes from the generator chamber 22 to feed into the top of the middle portion of the reforming chamber 54 and combine with the fresh feed fuel inlet at the entrance to the mixer chamber 52, at a mixer nozzle 50, at the bottom of the reforming chamber 54. This mixer nozzle 50 is located near the bottom of the reformer chamber at the entrance to the mixer-diffuser chamber 52. This allows recirculation of the portion of the spent fuel fed into channel 46 to mix with the fresh feed fuel near mixer nozzle 50, to provide a reformable fuel mixture of the two gases, shown by arrows 51. The mixer nozzle 50 is preferably within the inner portion of the reforming chamber 54, that is at the bottom of the reforming chamber near the entrance to the mixer-diffuser, where fresh fuel and spent fuel meet, as shown. Unless the mixer nozzle is clearly removed from the reforming chamber it is considered "within" the reforming chamber.

The geometry of the mixer nozzle/mixer-diffuser is further designed such that the dynamic energy of the fuel at the nozzle 50 is effectively and efficiently converted to an elevated pressure. This is preferably accomplished by having the cross-sectional area get larger as it proceeds from the mixer-diffuser entrance near nozzle 50, to its exit in one fashion as shown. The spent fuel and fresh fuel mix at the bottom of the mixer-diffuser 52, and are expanded at the top.

The reformable fuel mixture 51 will contain at least water vapor (steam) and usually also $H_2$, CO, and $CO_2$, all contributed by the spent fuel that enters mixer-diffuser chamber 52. Preferably, the volume ratio of spent fuel to fresh feed fuel will be adjusted by the velocity of the fresh feed fuel input so that approximately 2 volumes to 5 volumes of water vapor and $CO_2$ are added to each volume of fresh feed fuel, when the fuel, is natural gas. The presence of water vapor plus a reforming catalyst, most commonly Ni, allows conversion of gaseous hydrocarbons to $CO+H_2$, by the reaction:

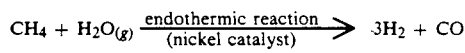
$$CH_4 + H_2O_{(g)} \xrightarrow[\text{(nickel catalyst)}]{\text{endothermic reaction}} 3H_2 + CO$$

The reformable fuel mixture 51 then passes through a series of passageways, from the mixer-diffuser chamber exit into and through an outer portion of reforming chamber 54, containing reforming material 56, such as nickel, or the like, or other well-known useful reforming material for fuel gas.

In the design shown in the FIGURE, the reforming chamber 54 has a top portion 55 closest to the generator chamber 22 and a bottom portion 57 closest to the fresh gaseous feed fuel inlet 28, and has an integrated mixer nozzle 50 and mixer-diffuser 52 contained within its structure. The reforming chamber 54 is preferably of concentric tubular design, with an outer section or channel containing the reforming material 56, and connected with an inner section or channel containing mixer nozzle 50 and mixer-diffuser 52, both contained within shell barrier 61, and a middle section or channel 64 between the inner and outer portions, for receiving hot recirculation gas from the gaseous spent fuel recirculation channel 46. The mixer nozzle 50 and mixer-diffuser 52 are both within the reforming chamber and substantially exterior to the main portion of the apparatus, as shown in the FIGURE. Both the mixer nozzle and mixer diffuser are readily accessible and readily removable from the apparatus.

Hot recirculation gas flowing downward in middle section or channel 64 between the outer section and the exterior of shell 61, passes into the bottom of the inner section and mixes with fresh gaseous feed fuel F at the mixer nozzle 50, near the bottom portion 57 of the reforming chamber 54. The recirculation gas in channel 64 transfers heat to the fuel mixture inside shell 61 and to the reforming material 56. The mixture enters the narrow bottom section of mixer-diffuser 52 and expands as it travels upward within the mixer-diffuser 52, as it passes to a top portion of the reforming chamber at the top of shell 61.

The expanded mixture then flows back toward the bottom portion 57 of the reforming chamber around the outside of the mixer-diffuser 52, in a channel between the mixer-diffuser and the inside of shell 61, all the while being heated by the hot recirculation gas in the channel 64. The expanded mixture then enters the outer portion or channel of the reforming chamber, which contains reforming material, near the bottom portion 57 of the reforming chamber 54 through inlets 65 and again flows upward through the reforming material 56 in the outer portion of the reforming chamber. This outer portion of the reforming chamber connects to the generator chamber 22, through channels 58 and 59, or any other series of passageways; that is, it is connected in some fashion by passageways.

As can be seen, hot recirculation gas flows downward, around the shell 61, then upward within the mixer-diffuser 52, then downward again around the outside of the mixer-diffuser within the shell 61, and finally through inlets 65 into the outer portion containing the reforming material where the mixture again flows upward toward the generator chamber. All the winding gas flow allows enhanced recuperation of heat, and compaction of design so that the entire generator apparatus can be made smaller from top to bottom.

Hot spent fuel from channel 46 reaches the entrance to middle section or channel 64 at a temperature of approximately 1,000° C. Section 64, in contact with the outer section of the reforming chamber, allows heat transfer to the reforming material 56. Heat transfer also occurs between section or channel 64 and the downward flow of reformable fuel mixture within shell 61. This reduces the spent fuel temperature, provides heat for the endothermic reforming reaction, and provides preheating of the reformable fuel mixture. With regard to the reformer 54, complete reforming of the fuel is not necessary since some internal catalytic reforming of the reformable fuel mixture, by the nickel fiber felts 40, or the nickel cermet surface 18 of the fuel cells, within the generator chamber 22, can be utilized to keep the amount of reforming material 56 relatively small.

In the embodiment shown, the temperature of the spent fuel drops from approximately 1,000° C. at the entrance to middle section 64, to a sufficiently low temperature as it approaches the nozzle 50 such that the fuel in the mixer-diffuser chamber 52 will not exceed 400° C. The combusted exhaust gas E in separate channels 45, as shown in the drawing, can contact the sides of the reforming chamber 54, and will pass out of the apparatus at approximately 700° C.

As can be seen in the FIGURE, the entire reforming chamber 54 with integrated mixer nozzle and mixer-diffuser subassembly is essentially interior, but exteriorly bolted onto the electrochemical apparatus 10. Thus, the mixer nozzle 50, and mixer-diffuser 52, while part of the electrochemical apparatus, are integrated with but substantially spaced apart from the combustion chamber 24 and the generator chamber 22. Thus, the mixer nozzle 50 can operate at below approximately 400° C., which would be the approximate temperature at the mixer nozzle 50 and entrance to the mixer-diffuser 52.

Thus, the mixer nozzle is extended by gaseous component ducts or channels to a position remote from the high-temperature active generating and combusting region of the apparatus, and can operate at a sufficiently low temperature to prevent carbon deposition. Also, the gaseous component ducts or channels are coupled or arranged in a manner to facilitate heat exchange from hot spent fuel to a reformable fuel mixture, thus conserving much of the thermal energy of the recirculating fuel gas, while maintaining a low nozzle temperature to prevent carbon deposition. This combination, coupled with reformer contact and double reverse flow of the gases involved, allows utilization of the high temperature spent fuel gas to provide a portion of the endothermic energy requirement of the reforming reaction. Finally, the primary gas seals can be extended and located in a colder region 67, and allow ease of disassembly and replacement of the reforming chamber 54 and the integrated mixer nozzle 50, and mixer diffuser 52, as a cartridge unit.

I claim:

1. An electrochemical apparatus comprising:
   (1) fresh gaseous feed fuel inlet,
   (2) gaseous feed oxidant inlet,
   (3) gaseous spent fuel recirculation channel,
   (4) separate hot combusted exhaust gas exit channel,
   (5) a generator chamber containing a plurality of electrochemical cells, and
   (6) a reforming chamber, where the reforming chamber has a top close to the generator chamber, and a bottom close to the fresh gaseous feed fuel inlet, and contains:
   (a) an outer portion containing reforming material, which outer portion connects to the generator chamber,
   (b) an inner portion containing a mixer-diffuser within a shell barrier, which inner portion connects to the outer portion at the bottom of the reforming chamber, and
   (c) a middle portion between the inner and outer portions, connected to the gaseous spent fuel recirculation channel at the top of the reforming chamber and feeding into the mixer-diffuser at the bottom of the reforming chamber, where the mixer-diffuser is within the reforming chamber, a mixer nozzle is near the bottom of the reforming chamber, which mixer nozzle is connected to the fresh gaseous feed fuel inlet, and where the mixer nozzle also feeds into the mixer-diffuser at the bottom of the reforming chamber.

2. The apparatus of claim 1, where the chambers are within a metal housing and the mixer nozzle and mixer-diffuser are both within the reforming chamber.

3. The apparatus of claim 1, where the electrochemical cells are fuel cells, the fresh gaseous feed fuel is natural gas, the air electrode contains doped $LaMnO_3$, the electrolyte is yttria stabilized zirconia and the fuel electrode contains a zirconia-nickel cermet material.

4. The apparatus of claim 1, where a portion of the combusted exhaust gas exit channel contacts the outside of the reforming chamber.

5. The apparatus of claim 1, where catalytic reforming material is also in the generator chamber.

6. The apparatus of claim 1, where the reforming chamber, contains integrated mixer nozzle and mixer-diffuser, and is in the form of a replaceable subassembly cartridge unit, which is readily accessible and removable.

7. A high temperature electrochemical apparatus, operating on a gaseous oxidant and a fresh gaseous feed fuel, comprising:
   (1) fresh gaseous feed fuel inlet,
   (2) gaseous feed oxidant inlet,
   (3) gaseous spent fuel recirculation channel,
   (4) separate hot combusted exhaust gas exit channel,
   (5) a generator chamber containing a plurality of electrochemical cells, and
   (6) a reforming chamber, where the reforming chamber has a top close to the generator chamber and a cooler bottom close to the fresh gaseous feed fuel inlet, and contains:
   (a) an outer portion containing reforming material,
   (b) an inner portion containing a mixer-diffuser, and
   (c) a middle portion between the inner and outer portions, for receiving hot recirculation gas from the gaseous spent fuel recirculation channel; where the mixer-diffuser is within the reforming chamber, where hot recirculation gas fed into the middle portion of the reforming chamber mixes with fresh gaseous feed fuel at a mixer nozzle near the bottom of the reforming chamber, and the gaseous mixture expands in the mixer-diffuser as it passes to a top portion of the reforming chamber, and where the expanded gaseous mixture flows back toward the bottom of the reforming chamber around the mixer-diffuser, and then enters the outer portion of the reforming chamber near the bottom of the reforming chamber, and flows through the reforming material.

8. The apparatus of claim 7, where the chambers are within a metal housing and the mixer nozzle and mixer-diffuser are both within the reforming chamber.

9. The apparatus of claim 7, where the electrochemical cells are fuel cells, the fresh gaseous feed fuel is natural gas, the air electrode contains doped $LaMnO_3$, the electrolyte is yttria stabilized zirconia and the fuel electrode contains a zirconia-nickel cermet material.

10. The apparatus of claim 7, where a portion of the combusted exhaust gas exit channel contacts the outside of the reforming chamber.

11. The apparatus of claim 7, where catalytic reforming material is also in the generator chamber.

12. The apparatus of claim 7, where the reforming chamber, contains integrated mixer nozzle and mixer-diffuser, and is in the form of a replaceable subassembly cartridge unit which is readily accessible and removable.

* * * * *